United States Patent Office 3,558,432
Patented Jan. 26, 1971

3,558,432
WAXOLYTIC ENZYME PREPARATION
Richard M. Lycette, Villa Park, Ill.
(19 Brentwood Road, Augusta, Maine 04330)
No Drawing. Filed Jan. 24, 1968, Ser. No. 700,027
Int. Cl. C07g 7/028, 7/022
U.S. Cl. 195—66                          10 Claims

ABSTRACT OF THE DISCLOSURE

A method for the prepartion and purification of cerase, a wax decomposing enzyme, where the impure cerase is found in crude extracts of whole larvae of the wax moth or found in a crude bacteriological medium, a salts-wax medium or through mold fermentation. The method of purification includes the addition of toluene to the raw cerase material to increase the yields of the enzyme, centrifuging to remove debris, precipitating proteins with ammonium sulfate and centrifuging, dialysis against cold water, precipitation by adding acetone, removing acetone from supernatant, adding a solvent, adjusting the pH and extracting in a chromatogram, migrating the enzyme by electrophoresis and drying the formed crystals. The cerase enzyme is utilized as an antituberculous agent.

---

The present invention relates to the preparation and use of cerase, a wax decomposing enzyme, and more particularly to the method of purification of cerase.

Cerase is a waxolytic enzyme which may be found in bacterial and other microbial organisms, including fungi. This enzyme is known for its property of decomposing wax and has been tested and used as an antituberculous agent. However, the problem of the use of this enzyme is in the difficult purification process and the resultant high cost for cerase of a purity which could be injected into animals or humans. The present invention obviates this problem in providing a simplified and high yielding method of purification of the enzyme from the raw materials.

Among the objects of the present invention is the provision of a simplified method of isolation and purification of the enzyme cerase from bacterial or other microbial organisms. This enzyme has been found occurring naturally in the wax-moth larvae and can be formed by bacterial or mold fermentation. The cerase enzyme is isolated and purified through a series of stages of removing debris, extraction and crystallization.

Another object of the present invention is the provision of a simplified method of isolation and purification of the cerase enzyme where the yield of the enzyme is increased by the addition of toluene to the raw enzyme material and then the mixture is heated to drive off the toluene and inactivate any heat labile enzymes.

A further object of the present invention is the provision of a simplified method of isolation and purification of the cerase enzyme where the proteins in the raw material are precipitated by saturation with ammonium sulfate and refrigeration. The resulting supernatant is dialyzed to remove all sulfate ions, and hemin and nonhemin compounds are separated by precipitation with acetone. The acetone is driven off the supernatant and the cerase enzyme is then isolated by solvent extraction. A chromatogram is developed and extracted, the extract is electrodialyzed, and the enzyme is crystallized to its final purity.

Additional objects and advantages of my invention should be apparent to those skilled in the art from the following description and examples.

The enzyme cerase is a polypeptide having a molecular weight of approximately 125,000 and a very high iron content of approximately 0.8% and thus is an iron oxidase. Unique features of this enzyme reside in its high iron content and the very high oxidation state of the iron, either hexavalent or heptavalent, which state of oxidation make it possible for cerase to attack inert paraffins and waxes. In vitro studies show cerase is able to hydrolyze paraffins, high molecular waxes and their alcohols, as well as certain fatty acids. In vivo experiments suggest that the enzyme action is limited to the highest molecular waxes, such as those found in tuberculosis bacteria and other microorganisms.

From the chemical point of view, cerase attacks only R—$CH_2$—$CH_2$—R bonds, and thus differs from other peroxidases which attack various phenols and aromatic amines. Cerase is also a cyclophorase type enzyme but does not exhibit dehydrogenase activity in the classical sense. Such unique chemical effect is exemplified by the products of reaction with most of the substrates mentioned: peroxides, epoxides and water soluble ethers of reduced molecular weights. These products can be observed with the most pure crystalline preparations of the enzymes.

With respect to the physical properties of cerase, this enzyme is very resistant to heat but is sensitive to ultra low temperatures, having a temperature range of approximately 1° to 120° C. The optimum temperature range for enzymatic activity is approximately 30°–37° C. Cerase is stable in physiological systems in a pH range of 4–9 with the optimum pH range for enzymatic activity of 6–7.

Cerase is an oxygen requiring enzyme and is inert in entirely anaerobic systems, i.e., where oxygen is unavailable or is chemically bound. For enzymatic efficiency, calcium (ionic) is required as a cofactor, but such efficiency is reduced by chelating agents, such as ethylenediaminetetraacetic acid (EDTA). Solubility characteristics of cerase are very particular as the solubility parameters for the purified enzyme suggest that it combines with certain wetting factors in nature which make the enzyme hydrophillic. Cerase is highly soluble in nonaethylene glycol and carbitol acetate but is very insoluble in glycerol and ethylene glycol. The solubility in aqueous systems is normally low for cerase, but the solubility can be enhanced significantly with certain surfactants. Likewise, its solubility in glycols can be significantly enhanced using nonionic surfactants.

In the isolation and purification of the cerase enzyme, the raw material containing the impure cerase can be obtained from naturally occurring or prepared materials. The starting material can be prepared by bacterial or mold fermentation as illustrated in the following examples:

EXAMPLE I

In a bacterial fermentation, a wax flask and crude bacteriological medium are prepared by adding crude or purified bees wax or other suitable wax to conical flasks with cotton plugs. The flasks are sterilized in a circulating air oven at 300° F. for 1 hour or in an autoclave for 15 minutes at 15 pounds steam pressure. The flasks are then removed and rotated to distribute the wax as it begins to harden and put a thin coating about the sides and bottom of the flask. A nutrient broth plus 0.5% yeast extract is added which has been pasteurized in an autoclave. The broth should cover the highest level of wax in the flasks, but it should not interfere with adequate aeration during growth by rotation of the flasks.

The cooled flasks are inoculated with a waxolytic variant of *Bacillus cereus* (or other similar organisms capable of hydrolyzing wax) and rotated on a shaker at 37° C. until all of the wax shows the effects of the enzyme, either by whitening or by "swiss cheese" formation or both. The development of the enzyme may also be followed by pH changes. The liquor produced is then utilized in the later described isolation and purification process.

EXAMPLE II

A salts-wax medium may be used to reduce the level of organic matter in the liquor. Roll flasks are prepared with wax as set out in Example I, and then the following salts system, presterilized and cooled, is added as above to the roll flasks with their waxy films.

| Liquid medium for wax flasks: | Per liter, grams |
|---|---|
| Sodium ammonium phosphate | 1.5 |
| Monobasic potassium phosphate | 1.0 |
| Magnesium sulfate | 0.2 |
| Difco or other yeast extract (microbial) | 0.5 |
| Calcium chloride | 0.1 |
| Distilled water—to one liter. | |

Inoculation and culture development is the same as described above.

EXAMPLE III

The enzyme can also be developed from mold fermentation, either surface or submerged cultures. The following media can be employed for the cultivation of the mold *Blastomyces cerolytica* or its related organisms.

| Ingredient: | Grams |
|---|---|
| China wax, pure (USP) or crude bees wax | 15.0 |
| Xylidine | 30.0 |
| α-Diethylamino-β-oxy-propylamine (emulsant) | 1.0 |
| Calcium chloride | 0.05 |
| Potassium dihydrogen phosphate | 0.1 |
| Sodium monohydrogen phosphate | 0.06 |
| Magnesium sulfate | 0.001 |
| Ferro-ascorbate | 0.003 |
| Peptone W. | 2.000 |
| Distilled water | 120.00 |

Optional—5 gm. of litmus may be added to the above as an acid indicator.

The medium is completely warmed and mixed using a low heat of 50° C. It is then emulsified and sterilized three separate times at 80° C. according to the Liesegang technique (Kolloid Chemische Technol., p. 619, 1932). The medium is then cooled and inoculated with Blastomyces species and rotated in flasks until acid production or pH development indicate maximal enzyme development. The liquid is then filtered through millipore filters to remove particulate matter or contaminants. This material is then ready for isolation and purification.

EXAMPLE IV

This example relates to another formulation for mold fermentation.

| Ingredient: | Grams |
|---|---|
| China wax, pure (USP) or crude bees wax | 15.0 |
| Chloroform | 20.0 |
| Tween 80 (polyoxyethylene sorbitan monooleate) | 0.5 |
| Calcium chloride | 0.05 |
| Potassium dihydrogen phosphate | 0.1 |
| Sodium monohydrogen phosphate | 0.06 |
| Magnesium sulfate | 0.001 |
| Ferro ascorbate | 0.003 |
| Peptone W | 2.000 |
| Distilled water | 120.00 |

The procedure followed is the same as Example III. 5 gm. of litmus may optionally be added to the medium.

The bacterial procedure is usually much faster in terms of enzyme production and the yield may be higher; however, the level of purification of the enzyme could be better with the mold system. Cerase can also be produced from Fusarium molds and their relatives, but the details are not set out here as these four examples are only illustrative of providing the starting material for isolation and purification. The Fusarium molds require a little asparagin for optional growth on most media.

EXAMPLE V

Once the starting material has been obtained, either naturally or by bacterial or mold fermentation, the isolation and purification process begins. Utilizing the liquor obtained from the bacterial fermentation of either Example I or II above, the following steps are performed:

Step 1.—Use Buchner funnel with high speed filter paper or millipore filter to remove wax and other debris from the post-fermentation liquor or medium.

Step 2.—Add toluene (or toluol) USP (2 to 5% volume) and shake contents of the flask vigorously. This ruptures the cells releasing higher yields of the enzyme.

Step 3.—Heat the mixture in a flask for approximately 30 to 45 minutes at a temperature range of approximately 80–100° C. An open vessel may be employed here. This heating step inactivates the heat labile enzyme and drives off most of the toluene. Then cool the mixture to approximately 1–4° C.

Step 4.—Centrifuge the mixture at 12,000 to 15,000 r.p.m. in an international or other refrigerated centrifuge at equivalent gravities. The centrifuging removes other cellular debris and most denatured proteins.

Step 5.—Saturate the resultant solution with cold ammonium sulfate (approximately 1–4° C.) to precipitate most of the proteins, and refrigerate in preparation for the next step.

Step 6.—Centrifuge at 12,000 to 15,000 r.p.m. as in Step 4 and save the supernatant for the next step.

Step 7.—Dialyze the supernantant against cold tap water overnight and then against cold distilled water (approximately 1–4° C.) or deionized water until no sulfate ions can be detected in the supernatant. This dialysis operation can be done in a refrigerator at approximately 1–4° C.

Step 8.—Add pure acetone until no further precipitate is noted in the dialysate from Step 7. The action in this step separates the hemin from the nonhemin compounds.

Step 9.—Centrifuge at 12,000 to 15,000 r.p.m. discard the precipitate and use the supernatant for the next step.

Step 10.—Remove the acetone by heating the fluid at approximately 55 to 60° C. for approximately 30 to 40 minutes or by drying in vacuo overnight at approximately 35° C. and 28 inches vacuum. About 12 to 20 hours should be sufficient for this drying operation.

Step 11.—After most of the acetone has been removed from the preparation, add hot Cellosolve acetate plus 5% Triton WR1339 (oxyethylated tertiary octylphenol formaldehyde polymer) at approximately 100–150° C. The solvent preparation may be added on a 1 to 1 or a 1 to 2 volume basis.

Step 12.—Any insolubles from Step 10 are removed by filtration or centrifugation.

Step 13.—Adjust the acetate system to pH 6 with 1/10 molar phosphate buffer. Mix the fluid with approximately 1 gram of silicagel, of any suitable analytical grade, and apply to a silicagel column, prepared as disclosed in Methods of Enzymology, Colowick and Kaplan, vol. 3, 1957, Academic Press, New York. The chromatogram is developed using chemically pure ethylene glycol. Then the brown to brownish-purple portion of the cake is cut into sections and extracted with hot Cellosolve acetate at approximately 100° C. This acetate extractant contains approximately 0.1% Triton WR1339.

Step 14.—Cool this solution to room temperature (approximately 26° C.) and place in a U-tube with a plain agar partition. This partition is formed of 5% Bactoagar with 1/10 M. phosphate buffer, although any similar electrophoresis apparatus may be employed for this operation. Place distilled water containing 1/10 M. phosphate buffer in the opposite side of the tube, and insert a positive electrode in the enzyme system and a negative electrode on the reverse side. Apply a 6-volt, 12.5-amp. per 5 square centimeter current from a constant voltage supply; carbon electrodes may be used for this operation. The cerase enzyme should migrate completely to the cathode side in 72 hours or less depending upon the microbial source of the enzyme.

Step 15.—This step is one of two alternative methods:

Alternative A—dry the liquid on the cathode side by decanting small volumes into flasks and dry in vacuo over anhydrous calcium chloride. Wash the resulting crystals three times with pure pyrogen free water and dry in vacuum over phosphorous pentoxide ($P_2O_5$) at 35° C.

Alternative B—shake the liquid from the cathode side with an equal volume of pure chloroform, spectral grade, in separatory funnels and let set in refrigerated room or refrigerator at approximately 1–4° C. until crystals are maximally formed at the interface. This formation takes about 72 hours. Filter out the crystals with No. 7 Whatman filter paper or similar filter paper on Buchner funnels using low vacuum. Wash crystals three or four times with pyrogen-free distilled or deionized water and dry in a vacuum at approximately 35° C. over phosphorous pentoxide ($P_2O_5$) until completely dry and store in dark vials free of air, under nitrogen ($N_2$) at room temperature, or 1–4° C.

EXAMPLE VI

Utilizing the liquid from the mold fermentation of Example III or IV, the liquid is heated to a temperature of approximately 80–100° C. to destroy unwanted enzymes and protein as disclosed in Step 3 of Example V. Then the remaining Steps 4 through 15 are carried out to obtain the crystals of the cerase enzyme. Thus, Steps 1 and 2 of Example V are omitted when the mold fermentation material is utilized.

The cerase enzyme is intended for, but not limited to, use as a chemotherapeutic enzyme for treatment of tuberculosis and related diseases.

Having thus disclosed my invention, I claim:

1. A process of isolating and purifying a waxolytic enzyme, such as cerase, comprising the steps of, heating a liquor containing waxolytic enzymes approximately 35 to 40 minutes at a temperature range of approximately 80–100° C., cooling the mixture to a temperature range of approximately 1–4° C., removing cellular debris and most denatured proteins to leave a solution, saturating the solution with cold ammonium sulfate to precipitate proteins, dialyzing the supernatant against cold water until all sulfate ions are removed, adding acetone to the dialysate until no further precipitate is noted, removing the acetone from the supernatant, adding a hot solvent to the preparation, removing any insolubles, adjusting the pH and developing a chromatogram in a silicagel column, extracting the enzyme from the resultant cake with hot acetate solvent, electrophorizing the acetate extractant through an agar partition, and crystallizing the waxolytic enzymes from the cathode side of the electrophoresis operation, and washing and drying the waxolytic enzyme crystals thus obtained.

2. A process of isolating and purifying a waxolytic enzyme as set forth in claim 1, in which the liquor containing waxolytic enzymes is initially filtered to remove wax and other debris, adding toluene to the filtrate and shaking the filtrate to release higher yields of the enzyme prior to heating.

3. A process of isolating and purifying a waxolytic enzyme as set forth in claim 1 in which the removal of cellular debris and proteins and the various formed precipitates is accomplished by refrigerated centrifuging and removing the supernatant.

4. A process of isolating and purifying a waxolytic enzyme as set forth in claim 1, in which crystallization is accomplished by drying the liquid from the cathode side in small quantities in vacuo over anhydrous calcium chloride, washing the crystals with pure pyrogen-free water and drying in vacuum over phosphorous pentoxide.

5. A process of isolating and purifying a waxolytic enzyme as set forth in claim 1, in which crystallization is accomplished by shaking the liquid from the cathode side with an equal volume of chloroform in separatory funnels and letting set at a temperature of approximately 1–4° C., until crystals are fully formed at the liquid interface, filtering out the crystals under low vacuum, washing the crystals and drying in a vacuum at approximately 35° C. over phosphorous pentoxide.

6. A process for isolating and purifying a waxolytic enzyme as set forth in claim 1, in which the initial heating step inactivates the heat labile enzymes and drives off most of the toluene, and said acetate solvent is Cellosolve acetate.

7. A process for isolating and purifying a waxolytic enzyme as set forth in claim 1, in which acetone is removed by heating the supernatant at approximately 55–60° C. for approximately 30–40 minutes.

8. A process for isolating and purifying a waxolytic enzyme as set forth in claim 1, in which acetone is removed by drying in vacuo for approximately 12 to 20 hours at approximately 35° C.

9. A process for isolating and purifying a waxolytic enzyme as set forth in claim 1, in which the dialysis is performed at a temperature of from 1 to 4° C. and the electrophoresis reaction is accomplished at approximately 26° C.

10. A process for isolating and purifying a waxolytic enzyme as set forth in claim 6, in which the Cellosolve acetate for the chromatogram is at a temperature of approximately 100° C.

References Cited

Muftic, the British Journal of Tuberculosis, 1958, pp. 356–361.

LIONEL M. SHAPIRO, Primary Examiner